United States Patent

Mitchell et al.

[15] 3,657,010
[45] Apr. 18, 1972

[54] HEATING CORN SYRUP SOLIDS WITH ACIDS TO PRODUCE A DRY POWDER

[72] Inventors: William A. Mitchell, Lincoln Park, N.J.; William C. Seidel, Monsey, N.Y.

[73] Assignee: General Foods Corporation, White Plains, N.Y.

[22] Filed: Jan. 26, 1970

[21] Appl. No.: 5,955

[52] U.S. Cl. ................................................127/70, 99/78
[51] Int. Cl. ..........................................................C13k 1/00
[58] Field of Search ...............................127/70, 29; 99/78

[56] References Cited

UNITED STATES PATENTS

| | | | |
|---|---|---|---|
| 3,480,444 | 11/1969 | Mitchell | 99/78 |
| 2,433,818 | 12/1947 | Schopmeyer | 127/29 X |
| 2,502,935 | 4/1950 | Fetzer | 127/29 X |
| 3,140,186 | 7/1964 | Bender | 99/132 |
| 3,152,909 | 10/1964 | Raffensperger | 99/78 |

OTHER PUBLICATIONS

" Corn Syrups and Sugars," 2nd Ed., Corn Industries Research Foundation, Inc., Wash., D.C., 1958.

*Primary Examiner*—Morris O. Wolk
*Assistant Examiner*—Sidney Marantz
*Attorney*—Bruno P. Struzzi, Daniel J. Donovan and Thomas R. Savoie

[57] ABSTRACT

Hydrolyzed starch materials such as corn syrups are heated in the presence of acid to a temperature of about 300° F. to 370° F. The resultant product is allowed to cool and solidify; it may then be ground to a dry powder. The powder so produced can be stored in paper envelopes under rather severe temperature humidity conditions and will remain dry and will not clump.

7 Claims, No Drawings

HEATING CORN SYRUP SOLIDS WITH ACIDS TO PRODUCE A DRY POWDER

BACKGROUND OF THE INVENTION

Hydrolyzed starch solids are normally very hygroscopic materials which, after being dried, will take on water and become sticky and damp when exposed to even normal room conditions. Due to their relatively low, as compared to sucrose, sweetness impact, dried hydrolyzed starch solids are desirable as bulking agents in powdered food materials; however, because of their tendency to become sticky at ambient conditions, their use has been limited.

Corn syrup solids, a low cost hydrolyzed starch material, has been found to be an excellent bulking agent in the manufacture of powdered beverage compositions. The corn syrup solids have also been found to add body to the prepared beverage while adding only limited sweetness. These powdered compositions, however, are likely to be stored for a long period of time before being used by the consumer, and it is highly desirable that, even after prolonged storage, the consumer is presented with a free-flowing powder. The normal tendency of the corn syrup solids to become sticky and clump can be somewhat reduced if the material is stored in a moisture-proof container, such as a glass jar. However, from both a packaging and economic viewpoint it is highly desirable to be able to package these powdered beverage compositions in small paper envelopes.

SUMMARY OF THE INVENTION

By employing the procedure of this invention the tendency of dried, hydrolyzed starch materials to take on water under normal storage conditions has been substantially eliminated.

It has also been found that hydrolyzed starch materials treated according to this invention with finely ground (less than 200 U.S. standard mesh) food acids, such as fumaric or adipic, which normally have a very low rate of solution in cold water, will readily dissolve in cold (about 35° F. to 45° F.) water without any acid particles either sinking or clumping and floating on the water. A mere physical blend of hydrolyzed starch materials and such acids as fumaric and adipic requires several hours to pull all of the acid into solution whereas the acidified starch materials of this invention will completely dissolve in about one minute. The feature of cold-water soluble acid compositions containing materials of high dextrose content is discussed in our U.S. Pat. No. 3,480,444 issued Nov. 25, 1969.

The present invention is also useful in the production of "hard" candies which will not become sticky upon contact with the atmosphere and will not clump together when packaged in bulk form. This invention is especially adapted for those tart-tasting candies (e.g., sour-balls) in which the acid component is a highly desirable flavor additive.

It is an object of this invention to produce dry hydrolyzed starch materials which will not become sticky and damp when exposed to severe temperature-humidity conditions.

It is another object of this invention to produce an acidulated beverage powder containing hydrolyzed starch products which will be moisture stable and will be cold-water soluble.

These and other objects will become apparent from the description herein.

DESCRIPTION OF THE INVENTION

It has unexpectedly been found that when hydrolyzed starch materials, such as concentrated syrups, are heated in the presence of acid up to temperatures in the range of about 300° F. to 370° F. and the molten mass is then allowed to slowly cool and solidify, the resulting solid may be ground into a powder which possesses a substantially non-hygroscopic nature and which possesses a moisture content of less than 1 percent. While it is not wished to be limited to such, it is believed that the chemical mechanism that effects the results of this invention is basically a combination reaction, probably catalyzed by the acid, in which relatively stable anhydrides are formed.

The reaction involved in this invention is dependent upon the acid concentration and also upon the heating rate and maximum temperatures. A series of closely related but differing products can be produced by varying the above conditions as will be readily apparent to one skilled in the art.

The hydrolyzed starch materials employed in this invention may be either in syrup or solid form. The syrup may be a commercially available syrup (e.g., corn syrup) or may be prepared by dissolving hydrolyzed starch solids in a liquid medium. The hydrolyzed starch material preferably has a dextrose equivalent (D.E.) in the range of about 5 to 70.

The concentrated syrups are the preferred hydrolyzed starch materials for use in this invention since the acid material may be homogeneously blended with liquid syrups much easier than with dry solids. The concentrated syrups also possess the advantage of having a lesser amount of water to vaporize off before the desired reaction will proceed. As will be apparent, the water component of these syrups, which normally boil at below about 250° F., must be substantially eliminated in order to permit the temperature of the hydrolyzed starch material to reach the elevated levels which are required for the method of this invention.

Special hydrolyzed starch syrups or solids (e.g., modified dextrins) such as those produced by enzymes can be used to obtain bland-tasting, moisture-stable powders. Extensive acid and/or heat treatment can be employed to obtain products which may be less susceptible to amylase enzyme attack. These products could have possible applications in low calorie foods.

It is also to be understood that non-acidic, cold-water soluble, moisture-stable products can be produced by the inclusion of an acid removal step such as the well-known solvent extraction technique. When acid removal is desired it is preferable to employ a minimum of acid catalyst together with longer heating times. These products so produced will have a relatively low level of reducing sugars, and as previously suggested, will be less susceptible to amylase enzyme action.

The acids suitable for use in this invention can be any of the acceptable food acids, either organic or inorganic, which do not become volatile or decompose at the operating temperatures. These acids can be used in amounts up to those which will neither present an overly acidic taste to the consumer nor be in excess of the saturation point of any desired solution. Normally the acid is employed in the range of from 10 percent to 50 percent of the weight of the hydrolyzed starch solids. Examples of suitable acids are inorganic acids such as phosphoric and organic acids such as fumaric, adipic, malic, tartaric, etc.

The hydrolyzed starch materials which are employed in this invention are typically in the form of one of the commercially available corn syrups having a dextrose equivalent of from about 30 to 70 and a solids concentration of from about 75 percent to 85 percent. The corn syrup solids present in these commercial syrups normally contain up to about 50 percent monosaccharides, up to about 25 percent disaccharides, and lesser amounts of the individual higher polysaccharides. The carbohydrate composition of some typical acid-converted corn syrups are given below.

| (D.E.) | Percent saccharides | | | | | | | |
|---|---|---|---|---|---|---|---|---|
| | Mono- | Di- | Tri- | Tetra- | Penta- | Hexa- | Hepta- | Higher |
| 30 | 10.4 | 9.3 | 8.6 | 8.2 | 7.2 | 6.0 | 5.2 | 45.1 |
| 42 | 18.5 | 13.9 | 11.6 | 9.9 | 8.4 | 6.6 | 5.7 | 25.2 |
| 54 | 29.7 | 17.8 | 13.2 | 9.6 | 7.3 | 5.3 | 4.3 | 12.3 |
| 60 | 36.2 | 19.5 | 13.2 | 8.7 | 6.3 | 4.4 | 3.2 | 8.5 |

Other hydrolyzed starch syrups and solids within the 5 to 70 D.E. range, consisting essentially of mono-, di-, and trisaccharides and higher members in the homologous series, may also be readily employed in this invention.

Surprisingly the acid-heat treatment of hydrolyzed starch products such as corn syrup solids according to this invention, results in products which are not substantially changed in terms of color, taste, solubility, or viscosity. This is in marked distinction to the situation in which starch heat treated in the presence of acid will convert to the so-called dextrins which may possess noticeable color and off-flavors. It has also been found that when glucose is heat treated in the presence of acid a recombination reaction occurs which markedly alters the properties, such as solubility, of the glucose material. It would be expected that at the high temperatures employed in the method of this invention rather drastic changes in the hydrolyzed starch materials would occur; however, this has not been found to be the case. The hydrolyzed starch materials treated in accordance with this invention can be used for the same purposes as the untreated materials.

The dry powders formed in accordance with this invention have been retained as a free-flowing powder when subject to normal room conditions for periods of at least several months. These dry powders have also been stored in paper envelopes under such drastic conditions as 90° F. and 85 percent relative humidity (R.H.) and been found to remain as dry powders for several weeks. This is never possible when corn syrup solids not treated by the method of this invention are so exposed.

This invention is further illustrated but not limited by the following example.

EXAMPLE 810 grams of Corn Products Globe Syrup No. 1,121, corn syrup (78 percent solids, 43. D.E.), were placed along with 250 grams of finely ground (400 mesh) fumaric acid in a 5-quart bowl. By means of an electric jacket the mixture was heated until it reached a temperature of 318° F. The mass was spread on an aluminum foil belt and allowed to solidify by air-cooling to about room conditions. The material was then ground into a powder and sieved.

Using the powder of the above example the fraction through a No. 70 and on a No. 140 U.S. standard screen was taken and packed in paper envelopes so that each pack contained 3.2 grams of fumaric acid. These packs were stored at 90° F./85 percent R.H. and at 100° F./30 percent R.H. The material stored at 90° F./85 percent R.H. was free flowing and possessed acceptable solubility after three weeks of storage. The material stored at 100° F./30 percent R.H. was not clumped and possessed good solubility after 5 weeks of storage.

The dry powder produced according to this example is adapted to be incorporated into a powdered mix (beverage mix) and packaged in and distributed in paper envelopes.

It will be apparent that there are variations and modifications of this invention and that the ingredients and typical operating procedures may be varied without departing from the spirit of the invention.

Having thus described the invention what is claimed is:

1. A method of making moisture-stable hydrolyzed starch powder comprising the steps of:
    a. heating a hydrolyzed starch material having a dextrose equivalent of from 5 to 70 in the presence of acid to a temperature of from 300° F. to 370° F., said acid being one which will not become volatile or decompose at the operating temperature;
    b. slowly cooling the hydrolyzed starch to a solid state; and
    c. grinding the solidified material into a powder.
2. The method of claim 1 wherein the acid is a food acid of from 10 percent to 50 percent of the weight of the hydrolyzed starch material.
3. The method of claim 1 which includes an acid removal step.
4. The method of claim 1 wherein the hydrolyzed starch material is a concentrated syrup.
5. The method of claim 4 wherein the syrup is a corn syrup.
6. A method of making a moisture-stable beverage powder comprising the steps of heating a concentrated corn syrup having a dextrose equivalent of from 5 to 70 in the presence of from 10 percent to 50 percent the weight of the corn syrup solids of finely ground fumaric acid to a temperature between 300° F. and 370° F., air-cooling the syrup to a solid state, and grinding the solidified material to a powder.
7. The method of claim 6 wherein the fumaric acid is ground to less than 200 mesh.

* * * * *